Nov. 20, 1962

E. S. NEHER 3,064,422

CONTROL MECHANISM FOR CONTROLLING THE
TEMPERATURE IN COMBUSTION TURBINES

Filed March 15, 1955

INVENTOR

EUGEN S. NEHER

BY Dicke and Craig.

ATTORNEYS.

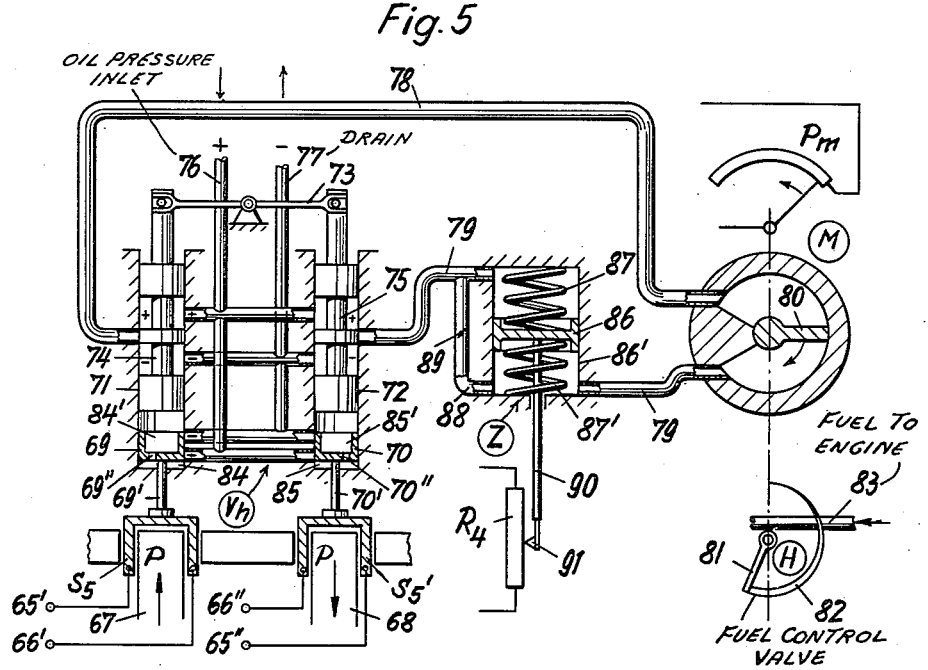
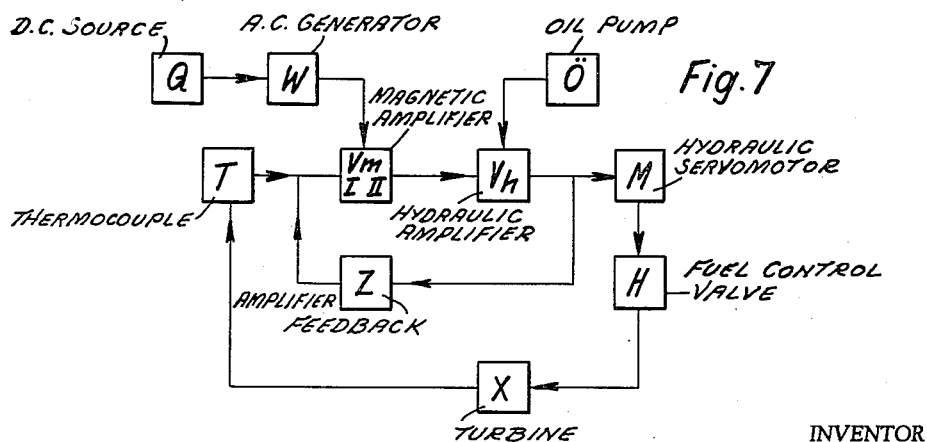

INVENTOR
EUGEN S. NEHER

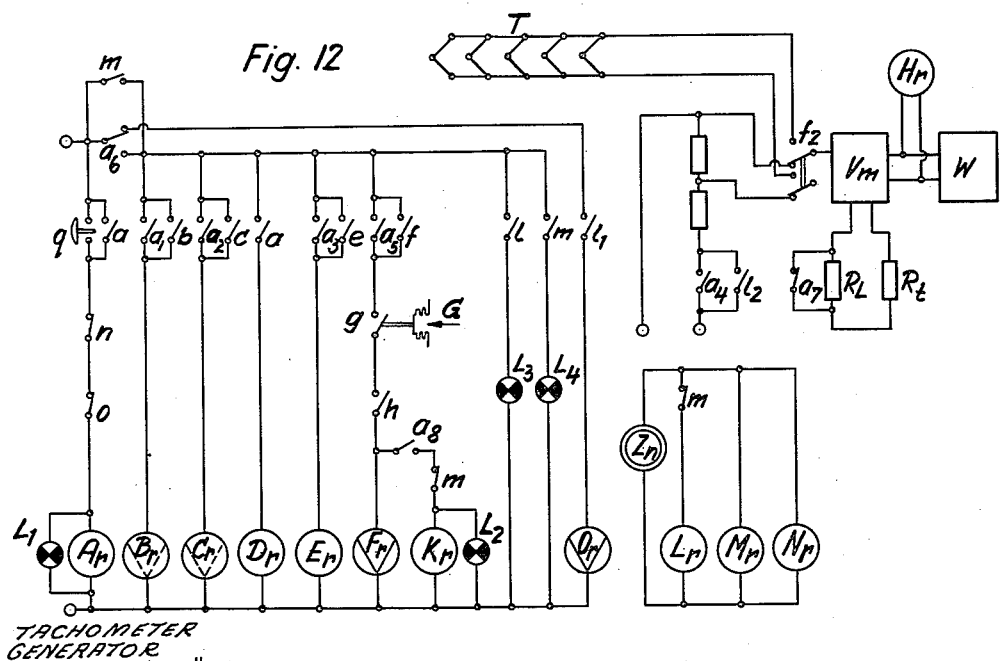
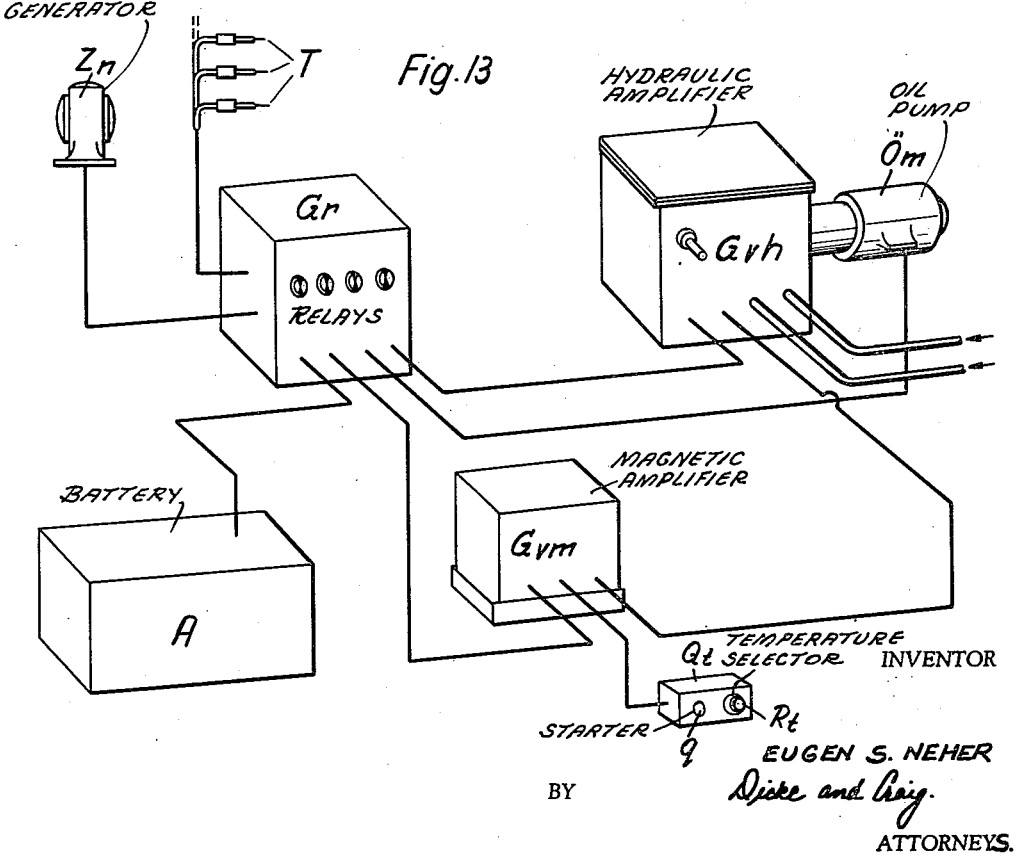

3,064,422
CONTROL MECHANISM FOR CONTROLLING THE
TEMPERATURE IN COMBUSTION TURBINES
Eugen S. Neher, Stuttgart-Oberturkheim, Germany, assignor to Daimler-Benz Aktiengesellschaft, Stuttgart-Unterturkheim, Germany
Filed Mar. 15, 1955, Ser. No. 494,508
Claims priority, application Germany Mar. 15, 1954
12 Claims. (Cl. 60—39.28)

The present invention relates to improvements in combustion turbines, and more particularly to a control mechanism for regulating the temperature thereof.

Turbine blades of internal combustion engines are endangered primarily by the high temperature of the fuel gases driving the turbine. This is true both for the entrance blades or guide vanes, as well as the moving blades, the latter being subjected to additional mechanical stresses by the high centrifugal forces. On the other hand, for reasons of economy the operational temperature should be made as high as possible. However, at increasingly high temperatures the stability or strength of the blade material decreases considerably, while at the same time the deformations caused by the "flowing" of the material increase considerably as the temperature rises. Because of the generally poor heat conductivity of the material, short thermal overloads cause high local peak stresses and may thus be the cause for the formation of cracks. Vibrations of the blades which may be of no consequence in an undamaged blade may in such a case cause the blade to break.

It is the object of the present invention to overcome these disadvantages by avoiding a thermal overload of the turbine or the turbine blade and by rendering such overload virtually impossible.

An essential feature of the present invention consists in the provision of a temperature-responsive control mechanism for limiting the temperature of the turbine blades automatically. Thus, if a certain admissible maximum temperature of the blade is being exceeded, the new control mechanism automatically limits or reduces the amount of fuel supplied to the combustion chamber to a lower maximum value. The temperature gauge may, for example, consist of a thermocouple which, preferably after suitable amplification, acts upon a control system which, in turn, influences the fuel control element or a suitable power control element of the turbine so that the highest admissible temperature either cannot be exceeded or will be counteracted as soon as it is exceeded.

According to another feature of the invention, the highest admissible temperature may be adjustable, for example, by being controlled not only responsive to the respective prevailing blade temperature, but also, for example, by being affected by some other control factor or by being influenced arbitrarily. This may be effected, for example, by varying a suitable auxiliary current and superimposing the same in an amplifier upon the current furnished by the thermocouple.

The amplifier to be used according to the present invention preferably consists of the combination of a magnetic amplifier in series with a hydraulic amplifier, the magnetic amplifier preferably having two stages. The hydraulic amplifier, on the other hand, preferably consists of a double unit which is not dependent upon its position and regulates the fuel supply to the turbine, for example, by means of a hydraulic servomotor. A so-called return lead or feed back circuit reacting upon the magnetic amplifier may be used to prevent a cyclic variation of the regulator. The present invention may thus be used in a particularly suitable manner to regulate the output of the engine within a predetermined temperature of the turbine or the fuel gases. Since the predeterminable maximum output may thus be determined by the highest admissible temperature, this control mechanism also assures a complete protection of the turbine against being thermally overloaded.

Another feature of the invention consists in the provision of suitable auxiliary control devices which supply auxiliary current impulses to the amplifier system so as to balance any unevenness in the relation between the temperature of the engine, on the one hand, and the speed of rotation or the position of the fuel control element, on the other hand.

Furthermore, the present invention provides mechanisms for preventing the turbine from pumping when a certain temperature within the speed-temperature characteristic is being exceeded. Such pumping which primarily consists of uncontrollable cyclic flows within the turbine blades, occurs if at sudden control impulses the adjusted temperature strongly increases and the speed of the turbine is unable to follow such control impulse sufficiently quickly.

This danger of pumping which easily occurs in the operation of gas turbines by too sudden a manipulation of the gas lever or by too frequent an actuation of the throttling member will be avoided according to the invention by connecting a coil of sufficient inductance in series with the variable resistance through which the auxiliary current flows for regulating the highest admissible temperature. If the variable resistance is suddenly actuated, the auxiliary current will follow a course prescribed by the inductance. By proper dimensioning, this course may be selected so that the current rise, and thus the throttling or shut-off member for the fuel will be actuated so slowly that a pumping cannot occur. At the same time, the additional inductance coil mentioned above is able to protect the turbine blades against excessively high mechanical stresses caused by sudden temperature variations. Since its time constant must in such case always be made higher than when it only has to protect the turbine from pumping, it will take up such protection against such pumping automatically.

The effectiveness of such a delayed counteraction may be further increased according to the invention by replacing the inductance coil by a transformer in which the primary side has the qualities of the aforementioned inductance coil, while the secondary side is connected, in parallel with the thermocouple, to the input side of the amplifier so as to cause a delayed operation of the throttling member through the amplifier.

Still another feature of the present invention in combination with the control of the engine by means of a regulation of the temperature consists in the provision of means for automatically starting the engine from the stand-still to idling by providing a suitable responsive circuit, for example, including relays, for placing the individual units consecutively into and out of operation.

Finally, the present invention provides reliable means for a remote control of the engine, which may be used, for example, in combination with an automatic starter.

Further objects, features, and advantages of the present invention will appear from the following detailed description thereof when read in connection with the accompanying drawings, in which—

FIG. 5 shows diagrammatically a hydraulic amplifier and the electrical circuit thereof;

FIG. 7 shows a diagram of the control circuit of such a temperature-limiting system;

FIG. 12 shows the principles of a circuit for automatically regulating the operation of a turbine; while FIG. 13 shows a perspective view of the entire arrangement of the different units composing the automatic control system.

Figure 1:
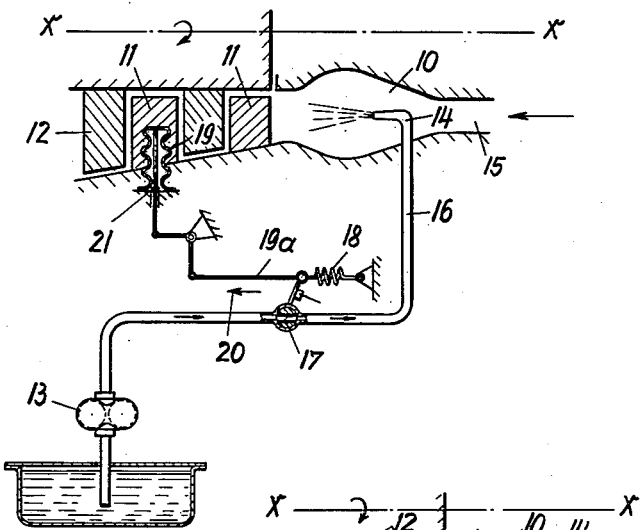
FIG. 1 is a simplified illustration of the principles of the invention.

Referring to the drawings and particularly to FIG. 1, the turbine which is rotatable about the axis x—x is diagrammatically illustrated as comprising the combustion chamber 10, two guide or stator blades 11, and two moving or rotor blades 12. The fuel is supplied in any suitable manner by a pump 13, through a pipe 16 to the injection nozzle 14 provided in the combustion chamber 10 of the turbine, while the combustion air is supplied thereto by a compressor (not shown) through the inlet pipe 15. A throttling or shut-off valve 17 is provided within the fuel supply pipe 16 and is normally held in the open position by a spring 18 and in engagement with a stop member 18a so as to permit the fuel to flow freely to the nozzle 14. For reasons of simplicity, the control elements provided in the fuel supply system for regulating the fuel supply either automatically or arbitrarily, have not been shown in the drawing.

The temperature of the guide blades 11 acts upon a temperature gauge which has been indicated in FIG. 1 in the form of a thermostat 19 which acts through a lever system 19a upon the trottling or shut-off member 17. If the temperature of the guide blade 11 increases beyond a certain value, this will cause the thermostat 19, which is adjusted, for example, by a stop member 21 so as to be under an initial tension below such temperature, to expand and to adjust the levers 19a in the direction shown by the arrow 20, thereby moving the throttling valve 17 into a more or less throttling position or even into a full closure or shut-off position. The amount of fuel emerging from the nozzle 14 will thus be reduced and the temperature lowered so as to prevent the predetermined admissible maximum temperature from being exceeded. If desired, it is also possible to provide an additional control mechanism for adjusting the respective temperature at which the thermostat is supposed to respond, for example, by adjusting the initial tension of the spring 18.

In the embodiment of the invention shown in FIG. 2, the numeral 10 again indicates the combustion chamber, numeral 11 the guide blades, and numeral 12 the moving blades of the turbine. The temperature gauge consists of a thermocouple 22, which, similarly as in FIG. 1, is mounted within one of the guide blades 11 but may also be provided within the moving blade 12, in the path of the gas current itself, or any other suitable place where the temperature of the turbine may be measured. Such different mounting of the temperature gauge likewise applies to the thermostat 19 shown in FIG. 1. The current of the thermocouple 22 is transmitted through a line or circuit 23 to an amplifier 24 which is supplied with its operating current, for example, by a source of current 25 through a line or circuit 26. The amplifier line or circuit 27 leads to the coil 28 of an electromagnet 29 which in combination with a spring 30 moves the double-throw switch 31 alternately into one or the other end position. A control device 32 permits the operation of the amplifier, and thus the temperature of the turbine at which the core 29 of the electromagnet is attracted to be regulated arbitrarily.

The double-throw switch 31 may, for example, consist of two lever arms 33 and 34 which are interconnected by a tension spring 35 so that, if the arm 34 passes beyond the dead-center position relative to the arm 33, the latter is quickly jerked-over to the other position by the action of spring 35, thereby being disengaged from one of the two contacts 36 or 37 and being connected with the other contact. Arm 33 is connected with the current source 25, for example, by a circuit or line 38 which is connected to the pivot point of the arm 33. Contact 36 is connected by a circuit or line 39 with the contact 40 of a double-contact bar 40, 41, while contact 37 is connected by a circuit or line 42 with the contact 43 of a second double-contact bar 43, 44. Contact 41 is further connected by a circuit or line 45 with the field winding 46 of an electric motor 47, while contact 44 is connected by a circuit or line 48 with another field winding 49 of the motor 47 which is wound in opposite direction to the first winding so that when coil 49 is energized, the motor 47 will run in the opposite direction than when coil 46 is energized.

The electric motor 47 drives a worm gear 50 which is in engagement with the arm 51 of a three-armed lever 51, 52, 53. Arm 52 is designed as a contact bridge for each of the double-contact bars 40, 41, and 43, 44, respectively, so that in the right-hand end position as shown only the pair of contacts 40 and 41, and in the left-hand end position 52' only the pair of contacts 43 and 44, will be connected, while in the central position both pairs of contacts are connected with each other.

The arm 53 acts upon a valve stem 54 so as to throttle the fuel supply line 16 leading to the injection nozzle or close the same entirely. A spring 55 tends to press the valve stem 54 downwardly against the arm 53, such movement preferably being limited by a suitable stop.

Figure 2:
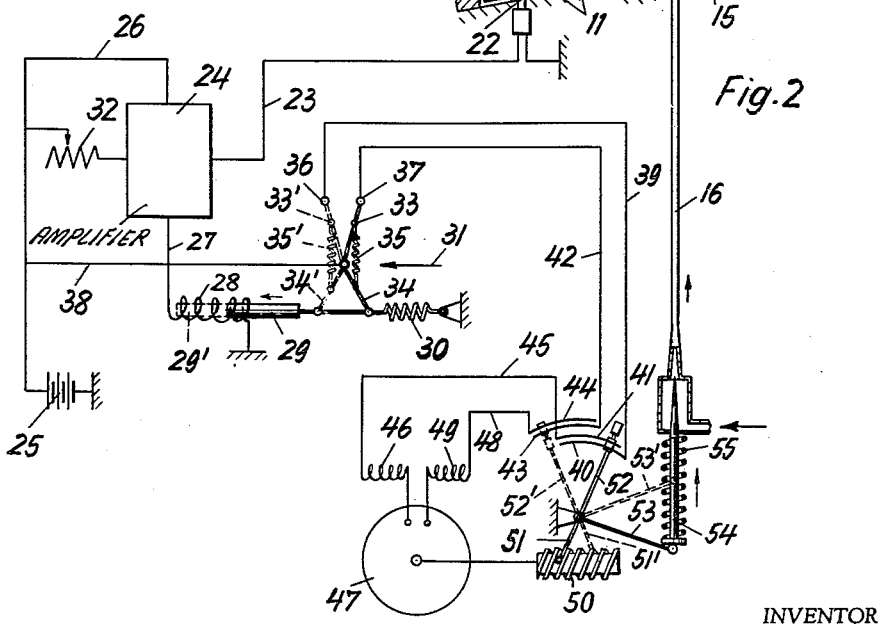
FIG. 2 shows a circuit for controlling the fuel supply by electrical means.

The operation of the apparatus as shown in FIG. 2 is as follows:

As long as the temperature of the turbine blades remains below the admissible maximum temperature as adjusted, switch 31 will be in the position indicated in full lines. The current flowing through the coil 28 is not of sufficient strength to draw the core 29 toward the left against the action of spring 30. Consequently, circuit 38 coming from the current source 25 will be connected with contact 43 through the circuit elements 33, 37, and 42, the circuit, however, being interrupted in the full-line position of arm 52, as shown in the drawing. Thus, motor 47 is not being operated, and valve stem 54 does not close the conduit 16, so that the fuel can flow freely and at an increasing amount to the combustion chamber 10.

If the temperature of the turbine blades increases, this will also increase the current in circuit 23 and therewith in the amplifier output circuit 27 until at a predetermined maximum temperature, which may be regulated, for example, by adjusting the variable resistance 32, coil 28 will attract the core 29 of the electromagnet against the action of the spring 30 so as to jerk the switch 31 quickly over to the position 34', 33' in a toggle-like manner. The current may then flow from the current source 25 through the circuit elements 38, 33', 36, 39, and 40 to contact bar 41, and thence through circuit 45 to the field winding 46 so as to rotate the electric motor 47, whereby the worm gear 50 will adjust the lever 51, 52, 53 in a counterclockwise direction, until the arm 52 reaches its left-hand end position 52', and arm 53 its upper end position 53' so that the valve stem 54 will shut off the fuel supply conduit 16.

When arriving in its end position 52', arm 52 cuts off the current since the contact bars 40 and 41 are then interrupted, thus stopping the motor 47 until the temperature of the turbine blades has again dropped below the admissible maximum value and the spring 30 again moves the switch 31 into the full-line position 34, 33. The current may then again flow through the circuit elements 38, 33, and 42 to contact 43 and thence through the arm 52 in its position 52' through circuit elements 44 and 48 to the field winding 49 so as to effect a reverse rotation of the motor 47 and, consequently, a movement of lever 51, 52, 53 in a clockwise direction. The throttling action of the valve stem 54 upon the fuel supply conduit 16 will thus be terminated and the arm 52 will again return to its right-hand end position.

If the temperature of the turbine blades at the thermocouple 22 has already decreased below the admissible maximum, for example, during the time in which the arm 52 is moved toward the left to the position 52', then switch 31 might move back prematurely, which would result in a reversal of the rotation of the motor and thus also of lever 52. Such constant back and forth movement or hunting, may be prevented by a hysteresis effect by the provision of a spring 35 or other suitable means.

Figure 3:
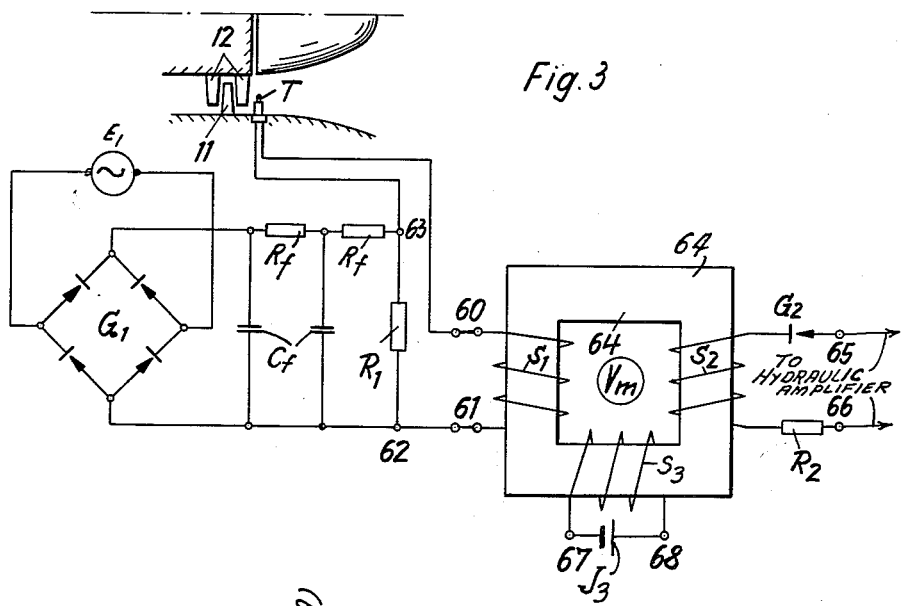
FIG. 3 shows the principal arrangement of a magnetic amplifier and a compensating circuit within the circuit of a thermocouple.

In the embodiment of the invention shown in FIG. 3, the thermocouple T is mounted at the turbine outlet. Such arrangement has the advantage that the gases will flow at such point at a much higher velocity and the temperature will be distributed much more uniformly than at the outlet of the combustion chamber. Also, the maximum temperatures of approximately 800° to 900° C. are then no longer as high as at the turbine inlet. On the other hand, the difference in temperature between the inlet and the outlet of the turbine which at a constant output is dependent upon the square of the speed of rotation, constitutes a disadvantage. Thus, as the speed increases, the temperature gauge produces too high a voltage at the terminals 60, 61 and thus indicates too high a temperature.

FIG. 3 indicates how such influence of the speed of rotation may be compensated by providing a differential connection at points 62 and 63, for example, at opposite sides of a resistance $R_1$ so as to subtract from the thermoelectric voltage a voltage which may change with the square of the speed and which may be easily produced by a small alternating current generator connected to the terminals $E_1$ and a rectifier $G_1$ having filter resistances R and filter C in its output circuit. By making the load resistance of the rectifier $G_1$ of the proper size the current in $R_1$ may be made to change in proportion to the square of the speed, and the control unit will then respond to the predetermined temperature of the turbine blades.

Although FIG. 3 shows only a single temperature gauge in the form of a thermocouple T, several such gauges, for example, five to eight, will usually be connected in parallel so that the same conditions may be maintained at the turbine over a greater length of time.

For amplifying the thermocurrent it is preferable to use a magnetic and a hydraulic amplifier. The principle of operation of the magnetic amplifier $V_m$ which contains neither tubes nor movable parts, is illustrated in FIG. 3. A core 64 formed of closed sheet-metal rings made of a special alloy such as Mumetal, Permalloy, or the like, carries the windings $s_1$, $s_2$, and $s_3$. The peculiarity of such special materials is that at a very small magnetic field strength they have a high permeability which may be made to disappear almost entirely by only small variations of the field strength. However, proportionally with the permeability also the reactance changes, and thus also the output taken up by the coil windings. If the winding $s_2$ is supplied with an alternating current which magnetizes the ring core 64 in such a manner that the maximum permeability will be attained, the permeability and thus the reactance of the winding $s_2$ will change as soon as the weak direct current produced by the thermocouple flows through the windings $s_1$, and as a result of the change in field strength caused thereby. Such change will be supported by the direct current component of the rectified alternating current $J_0$ supplied from an alternating current source which has been connected in series with the terminals 65 and 66 and rectified by the rectifier $G_2$. The new output current $J_2$ will then be considerably larger than the alternating current $J_0$ applied at 65 and 66. If $R_1$ is the resistance at the input side and $R_2$ that at the output side, the amplification is formed by the power ratio $$D = R_2 \frac{(J_2^2 - J_0^2)}{R \cdot J_1^2}$$

Figure 4:
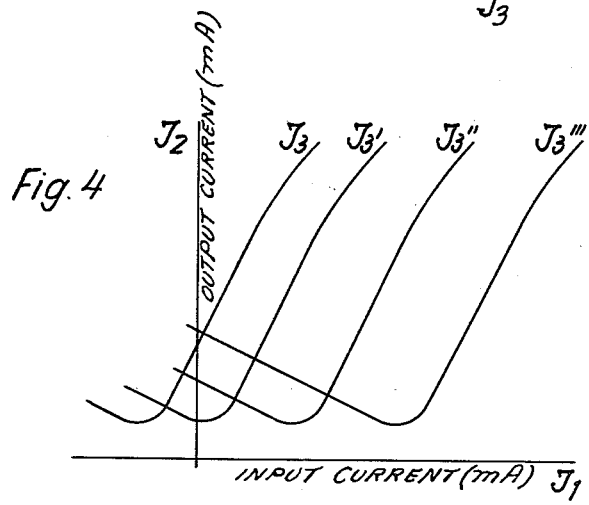
FIG. 4 shows the characteristics of a magnetic amplifier for different auxiliary currents.

A characteristic of the amplifier, that is, the correlation between the input current $J_1$ and the output current $J_2$, is illustrated in FIG. 4. Normally, in accordance with the curve $J_2$, the minimum of the output current lies within the negative range of the input current. At $J_1=0$, $J_2$ has already attained a considerable value, as the result of which a large part of the range to be used for the amplification would be lost. This disadvantage may, however, be overcome by the winding $s_3$ being supplied at 67 and 68 with a constant auxiliary current $J_3$. The characteristic curve $J_2$ may thus be shifted parallel to the abscissa, as indicated, for example, in FIG. 4 for various auxiliary currents $J_3$, $J_3'$, $J_3''$, and $J_3'''$.

In order to obtain the required power amplification of $10^6$-times, it is advisable to connect two magnetic amplifiers in series, which also has the advantage that by providing them in proper dimensions the system may be made independent of the supply current without loss of amplification.

The magnetic amplifier $V_m$ will furnish sufficient power to operate a hydraulic amplifier $V_h$. The diagram of such an amplifier is shown in FIG. 5, in which the amplifier which is combined with the control unit is designed as a double unit so as to make it independent of its position. The current taken from the magnetic amplifier is then supplied in opposed circuits at 65', 66', and 65'', 66'', respectively, to the two coil $s_5$ and $s_5'$, which are placed into the field of electromagnets 67 and 68, respectively, and move within the air gap of the magnets in accordance with the strength and effect of the current. Coils $s_5$ and $s_5'$ are connected to pistons 69 and 70, respectively, which slide in the cylinders 71 and 72, respectively, within which are also slidably mounted the control valve slides 74 and 75 which are connected with each other by a balance beam 73. The pressure oil, supplied, for example, by a suitable pump (not shown) enters at 76 and is again discharged at 77. Conduits 78 and 79 lead to the servomotor M having a vane type piston 80 the shaft of which carries the fuel control member 81 provided with a throttling member 82 of a valve H mounted in the fuel supply line 83, as well as, for example, the control member of a potentiometer $P_m$ which will be subsequently described in detail.

Pistons 69 and 70 are provided with bores 69'' and 70'', respectively, which connect the two sides 84, 84' and 85, 85', respectively, with each other.

If, for example, coil $s_5$ is pushed and displaced upwardly with a force P, a pressure $p$ coming from 76 will form above and below the piston 69. If D is the diameter of piston 69, and $d$ the diameter of piston rod 69', a force $$\frac{\pi}{4}d^2 \cdot p$$

which is opposed to the movement is subjected upon the piston 69, while the control slide 74 is acted upon by a force $$\frac{\pi}{4}D^2 p$$

This results in a pressure amplification of $D^2/d^2$.

Depending upon the movements of the control slide 74 and 75 caused by the forces and counterforces, the conduit 78 and 79 will be alternately connected with "+" or "—" (77), and the piston 80 of the servomotor M will thus be moved and the fuel supply line 83 be more or less throttled or freed, respectively.

In order to prevent the occurrence of oscillations in the operation of the hydraulic amplifier acting as a control unit, i.e., to prevent hunting thereof, a resilient return or feedback Z is provided. It reacts from the servomotor back upon the inlet of the magnetic amplifier (FIG. 3). For this purpose, the conduit 79 is provided with a cylinder 86' in which slides a piston 86 which is held in a state of balance by the springs 87, 87', and the two sides of which are connected with each other by a conduit 88, containing, for example, an adjustable valve 89. The piston rod 90 carries a slide contact 91 for adjusting a resistance $R_4$ of a Wheatstone bridge, as illustrated and discussed more fully in connection with FIG. 6.

As soon as oil is supplied to the piston 80 of the servomotor M, the oil will press simultaneously also in one or the other direction upon the piston 86 which is normally held in its central position by the springs 87 and 87' and is shifted by such pressure in one or the other direction. Thus, in the magnetic amplifier an effect will be produced which is opposed to the effect of the input current, and which tends to counteract the adjusting force exerted through the coils $s_5$ and $s_5'$ upon the hydraulic amplifier $V_h$ and thus upon the motor M. The adjustment of the return time constant is carried out by an adjustment of the valve 89, whereas the strength of the return is controlled by the resistance $R_4$.

Figure 6:
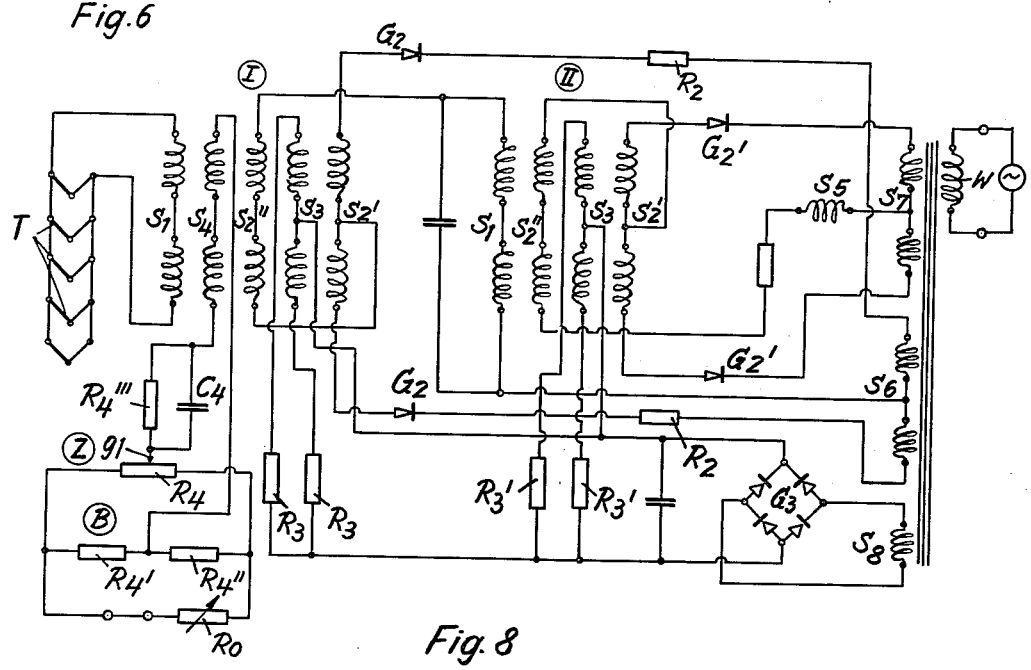
FIG. 6 shows the entire wiring diagram of a temperature-limiting system.

FIG. 6 illustrates a wiring diagram of the temperature control unit as previously described, but omitting therein the compensation circuit $E_1$, $G_1$, shown in FIG. 3.

Five thermocouples T are connected in parallel and act upon the coil $s_1$ of a first amplifier stage I. The output coil $s_2'$ is supplied with current from a source of alternating current W by the coil $s_6$ of a transformer. Output coil $s_2'$ is connected to the reaction coil $s_2''$ which is, on the one hand, connected to the center of the output coil $s_2'$ and, on the other hand, to the input coil $S_1$ of the second amplifier stage II, the other end of which is connected to the center of the coil $s_6$ of the transformer. The output coil $S_2'$ of the second stage II is connected similarly to reaction coil $S_2''$ of the second stage and to a supply coil $s_7$ of the transformer, while the circuit of the reaction coil $S_2''$ contains the coil $s_5$ of the hydraulic amplifier. The reaction coils $s_2''$ and $S_2''$ are tuned so as to give the amplification its desired value. In connection with coils $s_3$ and $S_3$ they serve at the same time to compensate the influence of the voltage upon the amplification. The hydraulic amplifier, which, as well as the servomotor M, is not illustrated in FIG. 6, is here assumed to be similar to the simple piston and control valve slide unit 69, 74 of FIGURE 5. The rectifiers required in the circuits of the output coils $s_2'$ and $S_2'$ are indicated by the letters $G_2$ and $G_2'$.

The coils $s_3$ and $S_3$ which are supplied with the auxiliary current are connected to the alternating current mains by a coil $s_8$, and the alternating current is converted into direct current by a rectifier $G_3$. Each half of the coils is connected in series with an ohmic resistance $R_3$ or $R_3'$, respectively.

The feedback Z of FIGURE 5 acts upon the coil $s_4$ of the first amplifier stage I in FIGURE 6. The resistance $R_4$ which is adjusted by the slide contact 91 forms a part of a Wheatstone bridge B which, apart from the variable resistance $R_4$, contains the additional resistances $R_4'$ and $R_4''$, the diagonal connection of which contains the coil $s_4$ with a resistance $R_4'''$ in series therewith and a capacitance $C_4$ in parallel with the latter. A variable resistance $R_0$ in the supply current line of the bridge permits the current flowing through the coil $s_4$ and thus the strength of the feedback to be controlled.

FIG. 7 illustrates the control diagram of the temperature limiting unit for the turbine X. A source of direct current Q, for example, a storage battery, drives an alternating current generator W which, in turn, supplies its current to the magnetic amplifier or amplifiers $V_m$ (or the amplifiers I and II in FIG. 6). The amplifier $V_m$ is acted upon by the thermocouples T. The hydraulic amplifier $V_h$ is supplied by an oil pump O and reacts back upon the magnetic amplifier $V_m$ through the return or feedback Z. The amplifier $V_h$ actuates the servomotor M, as shown in FIG. 5, which, in turn, controls the fuel supply valve H for the turbine X which is to be controlled by the thermocouples T.

Figure 6A:
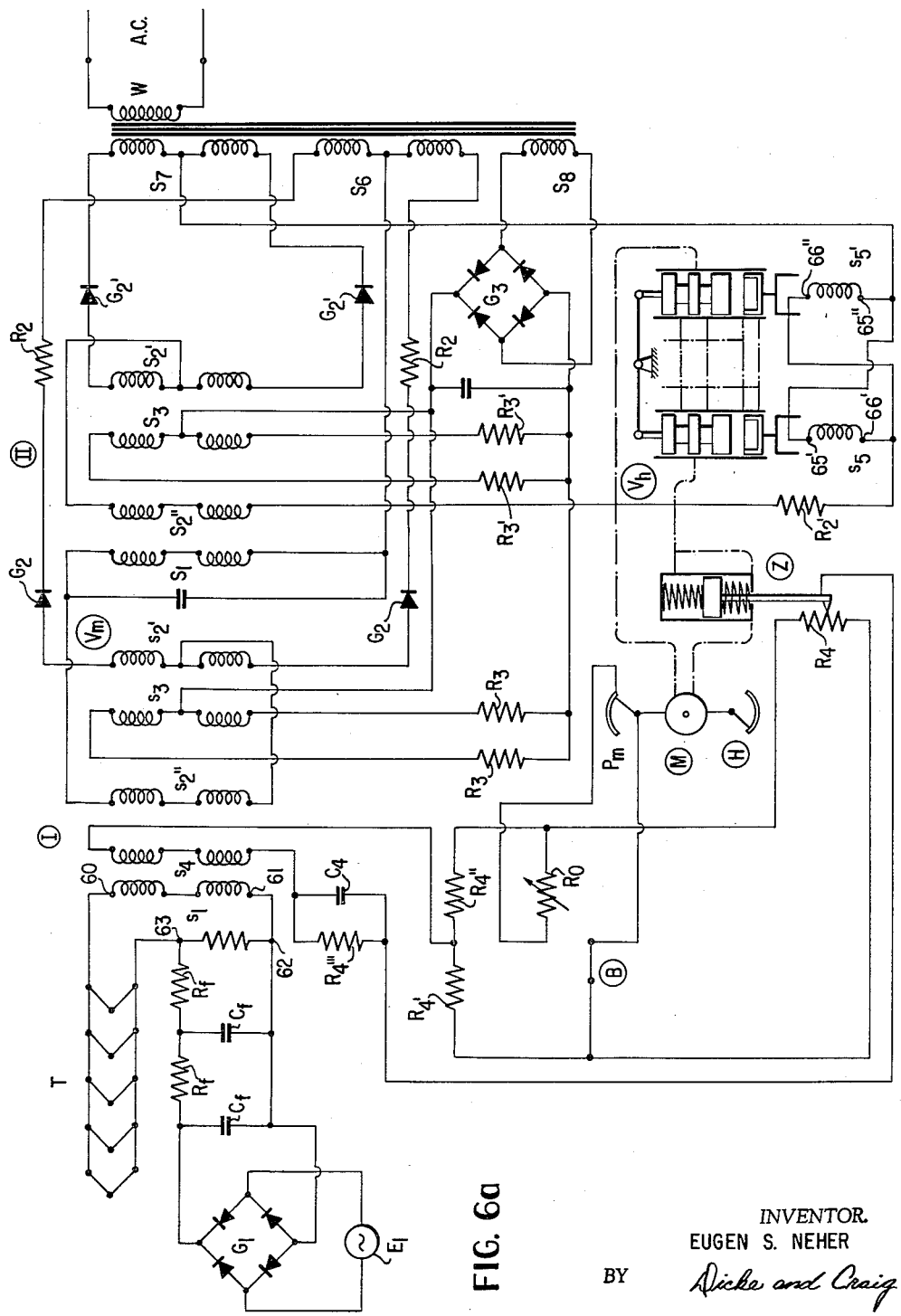
FIG. 6a shows the wiring diagram of a temperature-limiting system utilizing a magnetic amplifier followed by a hydraulic amplifier in accordance with the present invention.

FIG. 6a shows a wiring diagram similar to FIGURE 6 in which the output of the second magnetic amplifier II is so constructed and arranged as to actuate the two coils $s_5$ and $s_5'$ of the hydraulic amplifier $V_h$ of FIGURE 5. Additionally, this figure also shows the interconnection of the potentiometer $P_m$, discussed in connection with FIGURE 5 which is operative to provide a compensation during the portion of the operation of the device in which the temperature curve levels off as the speed of rotation decreases as will be more fully described hereinafter in connection with FIGS. 8, 9, 10 and 11.

Figure 8:
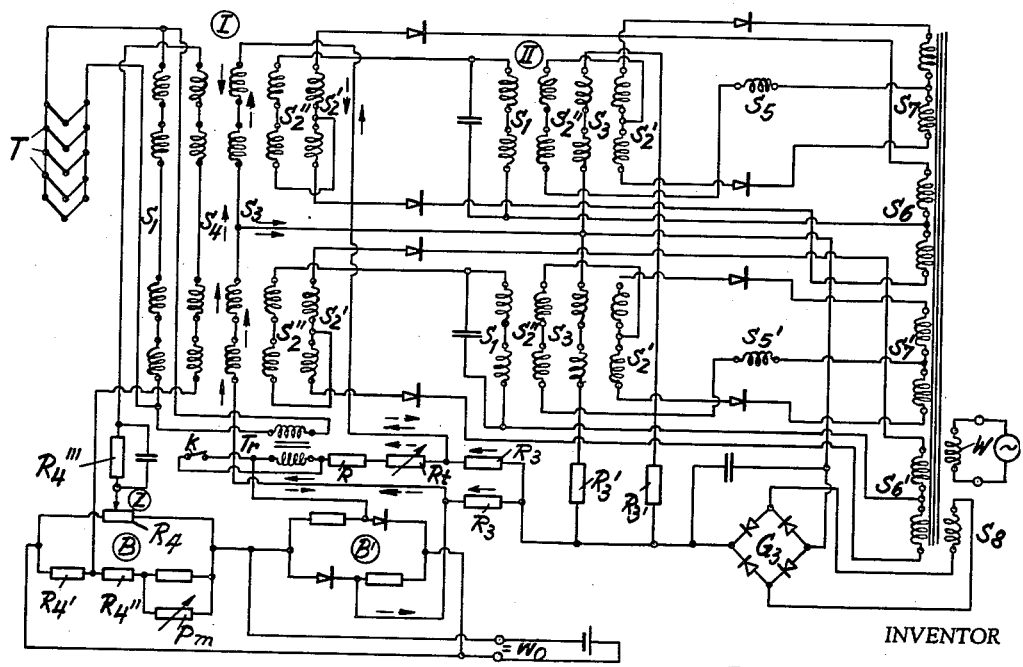
FIG. 8 shows a general view of the circuit of a temperature-control unit according to the invention.

FIG. 8 shows a wiring diagram similar to FIG. 6 in which the control system may be used not only for limiting the temperature of the turbine but to control the latter generally. This is possible especially if the gas turbines are normally driven at a constant or nearly constant speed, or in such turbines in which there is a definite relation between the speed of rotation and the load, such as in jet power plants or gas turbines for ships. The control is then preferably carried out in such a manner that at full load the highest admissible temperature, and at a partial load a corresponding lower operational temperature will be adjusted. This may be done, for example, by superimposing a variable auxiliary current upon the constant auxiliary current in the coil $s_3$ of the first amplifier stage I, which is produced by the fixed resistances $R_3$. By such superimposition, the characteristics of the two amplifiers I and II, and thus also their points of intersection are shifted parallel to the abscissa, that is, in proportion to the amplifier input current $J_1$, as illustrated in FIG. 4. Since the control unit now, however, regulates the temperature which corresponds to the point of intersection of the two characteristic curves, also the operational temperature of the turbine will change when the auxiliary current is changed.

The application of the control unit is not limited to a constant operation, but it may also protect the turbine against an excessive temperature during the starting period. By providing suitable throttling devices, either the highest admissible acceleration or deceleration in the load may be selected. Thus, the local overstressing of the blade material by excessively high temperature gradients may be avoided. Also, by limiting the highest admissible temperature change it is possible to obtain an effective protection against pumping of the turbine.

Figure 10:
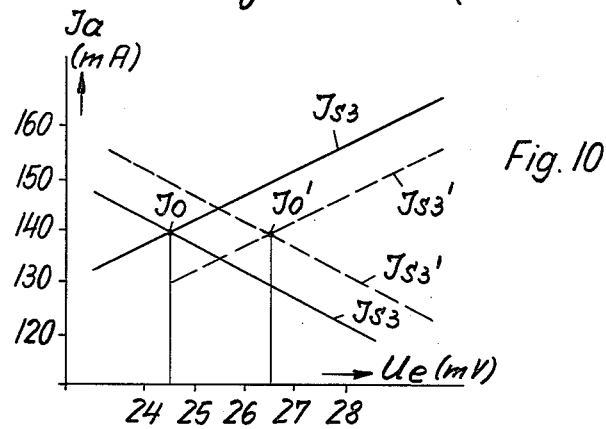
FIG. 10 shows a control diagram of two opposed amplifiers.

If, as in the case of the temperature limiting unit shown in FIG. 6 there is no variable resistance $R_t$, as described hereinafter, provided in the circuits of the auxiliary currents of both stages, these auxiliary currents in the coils $s_3$ and $S_3$ are determined by the coil $s_8$ through the rectifier $G_3$ and the resistance $R_3$ and $R_3'$. Since in such a case there is no possibility of changing, the operational point $J_0$ shown in FIG. 10 as the point of intersection of the two characteristics $J_{s3}$ and $J_{S3}$ is a fixed given point. In order to be able to adjust the turbine to a higher temperature, that is, to shift the operational point, as shown in FIG. 10, the current flowing through the coil $s_3$ may, for example, be additionally controlled in the manner indicated in FIG. 8. In the circuit shown in FIG. 8, the currents also provided for the purpose of temperature limitation flow from $G_3$ through $R_3$ in the direction of the full-line arrows through the coils $s_3$, and together with the number of windings of $s_2''$ and $S_2''$ they assure the amplification to be independent of the voltage. On the other hand, for controlling the turbine, that is, for shifting the operational point $J_0$ (FIG. 10), a further current is directed from a bridge B' through the resistances $R_t$ and R and a transformer $T_r$, and through the coils $s_3$ in the direction of the arrows shown in dotted lines, during which time this current is superimposed upon the current coming from $G_3$. Because of the opposite polarity of the amplifiers, the effects of the two currents are added to each other in one part of the amplifier (full-line and dotted arrows pointing in the same direction), while in another part of the amplifiers they are subtracted from each other (arrows pointing in different directions).

By modifying $R_t$, it is now possible to determine the strength of the auxiliary current and thus the admitted temperature of the turbine blades or the output of the turbine. The resistance R in FIG. 8 then has the purpose of limiting the current from the bridge B' (dotted arrows), even though $R_t$ is adjusted to the value zero.

The bridge B' which is connected in parallel with bridge B to direct current mains $W_0$ is built up of linear and nonlinear resistances, the linear resistances normally being made of a resistance alloy, while the nonlinear resistances may consist, for example, of a rectifier, a pyroelectric conductor, or an incandescent bulb. These resistances are preferably tuned in the bridge so that the diagonal voltage will remain practically constant while the supply current varies considerably.

The resistance $R_t$ is connected in series with the primary coil of a transformer $T_r$ which may be short-circuited, for example, by a switch $k$. The purpose of the transformer is as follows: Since both the magnetic as well as particularly also the hydraulic amplifier only have a very small time constant, the servomotor operates practically at the speed at which the auxiliary current flowing through the coil $s_3$ and determined by the variable resistance $R_t$ varies for the selection of the temperature. Such quick response of the servomotor and the sudden increase of the injected amount of fuel caused thereby while the speed of rotation is still unchanged is, however, undesirable.

Figure 9:
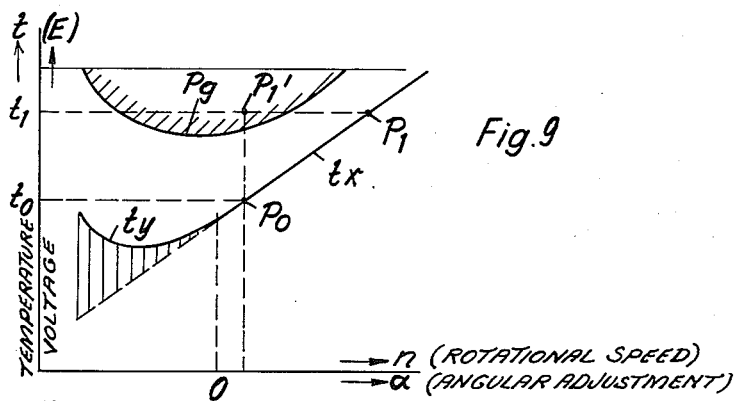
FIG. 9 shows a control characteristic of the temperature control unit.

In FIG. 9, the voltage E of the amplifier of the adjusted temperature $t$ (curve $t_x$) has been plotted as a function of the speed of rotation $n$ of the turbine or the control member, i.e., valve H as a function of the adjustment $\alpha$ thereof proportionally to the rotational speed $n$. $P_g$ indicates the pumping limit above which the turbine will start pumping. If, for example, $P_0$ indicates the operational point of the turbine at a particular time and corresponding to a temperature $t_0$, and if a change to a point $P_1$ in accordance with the temperature $t_1$ is desired, a point $P_1'$ would at first be attained, causing a pumping of the turbine if the control unit would respond immediately, inasmuch as the speed of rotation will be unable to follow immediately because of the inertia of the turbine. Such pumping is noticeable, particularly by the fact that local eddy currents occur, for example, within the blades causing considerable losses in output and possibly also endangering the entire machine.

The provision of the transformer $T_r$, however, permits the time constant to be made of any desired size since the latter increases with the inductance of the primary side. Thus, such inductance will preferably be made as large as possible. The effect of a slowed-down control operation obtained thereby, and thus of a protection against pumping may be further enhanced by connecting the secondary side of the transformer $T_r$ with proper polarity to the input side $s_1$ of the amplifier I, as shown in FIG. 8, rather than to $s_3$. By short-circuiting the transformer by means of the switch $k$ it is then possible at any time to overcome the delay caused by the transformer so that, if necessary, the machine may also be operated at a much greater speed.

A proper control of the turbine by controlling the blade temperatures also requires that the position of the fuel control member is at least substantially in proportion to the adjusted temperature. The highest admissible temperature is then determined by the end position of the variable resistance $R_t$ which may be located at any suitable point.

Such proportionality is, however, not obtained as a matter of course. As shown in FIG. 9, shortly before the fuel supply is completely shut off, that is, for example, at the point 0, the temperature rises as shown by the curve $t_y$ in accordance with the position $\alpha$ of the fuel control member or with a low speed of rotation $n$, thus furnishing two control positions of the control member H for any prescribed temperature. Since the control unit would close the fuel valve when the temperature rises because of a deceleration of the speed, a second control impulse is provided which is brought into action beginning at the point where the temperature curve levels off as the speed of rotation decreases.

For this purpose, the present invention provides the potentiometer $P_m$, as shown in FIG. 5 and previously mentioned, which is coupled, for example, with the fuel valve H, and the slide contact of which is held by a spring in its neutral position as long as the valve H operates within the straight-line portion of its characteristic $t_x$. If this slide contact, however, enters the range in which the temperature curve begins to level off (point 0), it will be adjusted by a finger mounted on the rotary axis of the servomotor, and thus transmits through $P_m$ and $s_4$ a part of the voltage applied thereto to the input side of the amplifier in such a manner that its effect will be subtracted from that of the thermovoltage. By suitable adapting it is thus possible to shape the resulting characteristic of the control member so as to follow a substantially straight line up to such speed ranges where the machine will no longer be operative without separate drive.

In FIG. 8, contrary to FIG. 6, the output coils $s_2'$ and $s_2''$, of the first amplifier stage I, as well as the coils $S_2'$ and $S_2''$ of the second amplifier stage II are duplicated with the two last-mentioned acting upon the coils $s_5$ and $s_5'$ of the hydraulic amplifier shown in FIG. 5 in the opposed direction. By adjusting the variable resistance $R_t$, the characteristics $J_{s3}$ and $J_{S3}$ (FIG. 10) of the auxiliary current flowing through the coils $s_3$ and $S_3$, respectively, will be shifted parallel to each other, as shown in FIG. 10, in which case the points of intersection, for example, $J_0$ or $J_0'$, determine the state of balance of the coils $s_5$ and $s_5'$ or the pistons 69 and 70 of the hydraulic amplifier $V_h$.

Figure 11:
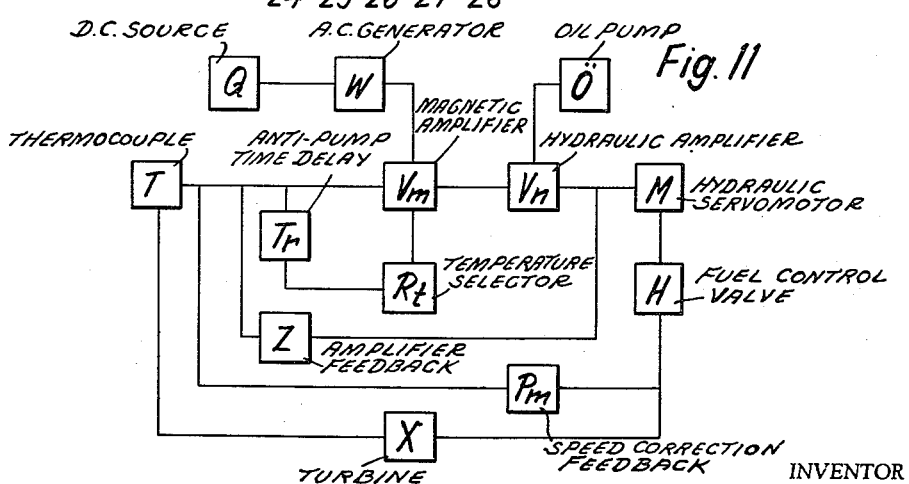
FIG. 11 shows a control diagram of such a temperature regulator.

FIG. 11 illustrates the wiring diagram of the control unit according to FIG. 8 operating by means of the temperature adjustment. This diagram varies from that shown in FIG. 7 only by the additional provision of the variable resistance $R_t$ for the protection against pumping (transformer $T_r$) and determining the temperature, and of the second control impulse (potentiometer $P_m$) for obtaining a linear temperature-speed diagram (FIG. 9).

FIG. 12 shows a basic circuit diagram for starting the turbine fully automatically and for remotely controlling the same by means of the control unit as described.

The letters $A_r$, $B_r$, $C_r$, $D_r$, $E_r$, $F_r$, $H_r$, $K_r$, $L_r$, $M_r$, $N_r$, and $O_r$ indicate different relay systems. The contacts marked "$a$" ($a$, $a_1$ to $a_8$) are all coupled with the relay $A_r$ and are opened or closed simultaneously therewith, while the contacts $b$, $c$, $e$, $f$, etc. are respectively closed as the relay systems having the same corresponding capital letters, i.e., $B_r$, $C_r$, $E_r$, $F_r$, etc., are actuated. G indicates a pressure-responsive device for operating the contact $g$. $L_1$, $L_2$, $L_3$, $L_4$ indicate control lamps. W indicates the alternating current generator supplying the magnetic amplifier $V_m$, and $Z_n$ is an electric tachometer. $R_t$ is the variable resistance which is adjustable to the desired temperature and connected in series with an idling resistance $R_L$ which may be bridged at $a_7$. ($R_L$=for example, R, or a portion of R in FIG. 8.)

When the key $q$ is depressed, first the relay $A_r$ will respond since when the turbine is stopped, the contacts $n$ and $o$ are closed. The control lamp $L_1$ lights up and all contacts $a$ ($a$ to $a_8$) react. Relay $B_r$ then starts the oil pump for the hydraulic part of the control unit. At the same time, $a_1$ will be bridged by a self-holding contact $b$.

Relay C starts the operation of the motor generator W for the magnetic amplifier $V_m$, while at the same time $a_2$ will be bridged by the self-holding contact $c$. Either simultaneously or in succession herewith, relay $D_r$ switches on the ignition, and relay $E_r$ opens the main fuel valve, while $a_3$ is bridged by $e$.

Contact $a_4$ applies a direct current to the input side of the amplifier $V_m$, which is made of such strength that the control unit will close the fuel control member H, not shown in FIG. 12.

As soon as the oil pressure has reached its desired value, the contact $g$, and if the alternating current generator W has reached its desired voltage, also relay $H_r$ will respond. The time-delay relay $F_r$ and relay $K_r$ are supplied with current through $a_5$, $g$, and $h$, whereupon $K_r$ controls the first stage of the starter and the control lamp $L_2$ lights up. The turbine then begins to turn.

Relay $F_r$ switches the double contact $f_2$ over to the thermocouples T. Since the latter are cold, the control unit opens the fuel valve H so as to supply fuel to the machine which in the meantime has attained a speed corresponding to the ignition speed. As soon as the ignition has started, the temperature of the machine rises up to the value determined by the variable resistance R and the variable resistance $R_t$. Beginning at this moment, the control unit will take over the temperature control of the machine. The fuel valve H will then be closed in accordance to the resistances $R_L$ and $R_t$. As the speed of rotation increases the control unit opens, the temperature thus remaining practically constant.

The turbine drives a tachometer $Z_n$, the voltage of which rises linearly with the speed of rotation. At a certain speed corresponding approximately to the ignition speed, relay $L_r$ responds and connects, for example, a second starting stage. If several stages are desired, additional speed-responsive relay systems will be required. Control lamp $L_3$ lights up. The speed rises further until the turbine can accelerate of its own accord. Then, relay $M_r$ responds. Relay $K_r$ and $L_r$ no longer receive current and the starter will be disconnected. Control lamps $L_2$ and $L_3$ go out and lamp $L_4$ lights up. Contact $a_6$ will be bridged by $m$. In accordance with the auxiliary current in the magnetic amplifier determined by $R_L$ and $R_t$, the machine will then be further accelerated until at the idling speed the relay $N_r$ will respond. Then, $n$ interrupts the current supply to relay $A_r$. All contacts $a$ ($a$ to $a_8$) therefore move to their inoperative position. The ignition is switched off and control lamp $L_1$ goes out. Also, resistance $R_L$ is short-circuited by $a_7$. The relays $B_r$, $C_r$, $E_r$, and $F_r$ remain energized since contact $a_6$ has been bridged by $m$.

The temperature selector was, prior to the starting, adjusted to a value corresponding to the idling temperature. The machine will therefore not be further accelerated until another temperature will be selected. Thus, the starting process has been completed.

The machine may now be controlled by the variable resistance $R_t$ within the entire speed range. It is also possible to select speeds which are slower than the idling speed. In such a case, however, the contact $n$ again returns to its low speed or closed position. $A_r$, however, receives no current since the contact $a$ which bridges the contact $q$ is open. The lowest speed is that at which the turbine may still be accelerated without outside aid. If the speed be decreased below such point, relays $M_r$ drop off. Relays $B_r$, $C_r$, $E_r$, and $F_r$ no longer receive current. The control unit will thus be switched off, and the fuel supply shut off. If $B_r$ and $C_r$ are made to drop off with a slight delay relative to $F_r$, also the fuel valve H controlled by the control unit will be closed since when $F_r$ drops off, the input side of the amplifier will receive a current of sufficient strength through $l_2$ bridging $a_4$.

The relay $K_r$ can no longer respond since $A_r$ had already previously been switched off and $a_8$ had thus interrupted the lead to $K_r$.

In order to prevent a premature reconnection by the key $q$ while the machine is running out, the relay $O_r$ which drops off at a delay will then be used. When starting, $O_r$ cannot respond since $L_r$ does not respond until after $a_6$ has been switched over. During the time while $L_r$ is under current during the acceleration, $O_r$ will not respond since $a_6$ has been switched over. When slowing down, however, $A_r$ will be without current. Since when $M_r$ drops off, also $O_r$ will be energized and thereby switchover $/_1$, $O_r$ will then respond since $a_6$ is in the inoperative position as shown, and prevent $A_r$ from being reconnected during the period of the delay of $O_r$.

A perspective view of the entire temperature control system is shown in FIG. 13. The housing $G_r$ contains all the relays shown in FIG. 12 for starting the machine automatically and operating it constantly. This housing is supplied with the current of the thermocouples T and the current of the tachometers $Z_n$.

The housing $G_{vm}$ contains the magnetic amplifiers including the transformers supplying the alternating current for operating the amplifiers.

The little box $Q_t$ contains the key $q$ for starting the operation of the apparatus and the resistance $R_t$ for selecting the temperature. This box may be located at any desired distance from the turbine so that the latter may be both started as well as controlled from any remote point.

The housing $G_{vh}$ contains the hydraulic amplifiers $V_h$ with the feedback Z, the fuel valve H, the second control impulse $P_t$, and the oil pump O. The oil pump may be driven by a motor which may, for example, be flanged-on to the outside of the housing $O_m$. Finally, a storage battery A is provided for supplying the direct current required.

Although I have described my invention with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A control apparatus for combustion turbines comprising first means for regulating the supply of fuel to the combustion turbine, temperature responsive means for sensing a temperature within the turbine and directly producing electric thermo-currents in dependence on the temperature to which the turbine blades are subjected, and second means effectively providing a temperature limiting control substantially throughout the temperature range of said turbine in operation thereof and including amplifier means controlled by said electric thermo-currents to vary the amount of fuel supplied by said first means to said turbine and limit the maximum temperature to which the turbine blades are subjected to a predetermined value, said second means including additional control means for correctively varying said temperature limiting control effect produced by said second means on said first means, said second means including toggle-like switch means and means for actuating said toggle-like switch means in response to the turbine temperature, an electric motor with two circuits alternately interconnected by said toggle-like switch means, and means including a throttling member formed by said first means controlled by said electric motor and operative to interrupt operation of said electric motor upon attainment of one or other end positions by said throttling member to thereby stop said electric motor in either end position.

2. A control apparatus for combustion turbines comprising first means for regulating the supply of fuel to the combustion turbine, temperature responsive means for sensing a temperature within the turbine and directly producing electric thermo-currents in dependence on the temperature to which the turbine blades are subjected, and second means including amplifier means controlled by said electric thermo-currents to vary the amount of fuel supplied by said first means to said turbine and limit the maximum temperature to which the turbine blades are subjected to a predetermined value, said second means including additional control means for varying the control effect produced by said second means on said first means, said amplifier means including a hydraulic amplifier and wherein said first means includes a servo motor regulating the fuel supply, and feedback means for stabilizing the fuel control including a piston, spring means for maintaining said piston in a central position, the two sides of said piston being connected with each other by a conduit containing an adjustable throttle and connected to respond to varying pressure in said hydraulic amplifier, and means operated by said piston and connected to impose a control function on said amplifier means ahead of said hydraulic amplifier to oppose the adjusting action of said amplifier means.

3. A control apparatus for controlling the temperature of turbine blades in combustion turbines, comprising first means for regulating the supply of fuel to the combustion turbine, temperature responsive means for sensing a temperature at the turbine outlet and directly producing electric thermo-currents in dependence on the temperature to which the turbine blades are subjected, and second means including amplifier means controlled by said electric thermo-currents and operatively connected to said first-mentioned means to vary the amount of fuel supplied by said first means to said turbine, said second means including additional control means responsive to the turbine rotational speed for varying the control effect produced by said second means on said first means to correct for differences between the temperature at the inlet of the turbine and the temperature at the outlet of the turbine which differences are dependent on turbine speed.

4. A control apparatus for combustion turbines according to claim 3, wherein said additional control means is responsive to the speed of rotation of said turbine so as to provide a voltage increasing with the speed thereof which is opposed to the voltage produced by said temperature responsive means to thereby relatively reduce the control effect of said last-mentioned voltage as the speed increases.

5. A control apparatus for combustion turbines according to claim 3, wherein said amplifying means includes a magnetic amplifier with an additional circuit, and wherein said first means includes an adjustable fuel control member, said additional control means being operative to obtain a linear relationship between the gas temperature of said turbine and the adjusting range of said fuel control member and including a potentiometer operatively connected with said fuel control member for common adjustment therewith, and means including a variable resistance forming part of a Wheatstone bridge connected with said additional circuit to supply thereto below a certain speed of rotation an additional current which increasingly opposes the amplifier current of said magnetic amplifier as the speed of rotation thereof decreases.

6. A control apparatus for combustion turbines according to claim 3, wherein said amplifier means includes a magnetic amplifier having control means including an auxiliary circuit with an auxiliary coil, and wherein said additional control means is operative to regulate the temperature and therewith the output of said turbine and includes a variable resistor connected to the auxiliary coil of said auxiliary circuit, means including a rectifier for supplying a constant auxiliary current to said auxiliary coil, and means supplying to said auxiliary coil a variable auxiliary current dependent on the resistance of said variable resistor so as to be partly unidirectional with and partly opposed to said constant auxiliary current within said coil.

7. A control apparatus for combustion turbines according to claim 6, wherein said means for supplying a variable auxiliary current includes a bridge circuit.

8. A control apparatus for combustion turbines according to claim 6, further comprising additional auxiliary control means for said magnetic amplifier including means connected thereto for providing a delaying time constant for the control by said amplifier means to become effective to protect said turbine against pumping.

9. A control apparatus for combustion turbines according to claim 6, wherein said control means includes an input circuit and further comprising means including inductive coupling means of a transformer connected with both said auxiliary circuit and the input circuit of said magnetic amplifier for providing a delaying time constant for the control by said amplifier means to become effective to protect said turbine against pumping.

10. A control apparatus for combustion turbines, comprising first means for regulating the supply of fuel to the combustion turbine, temperature responsive means for sensing a temperature within the turbine and directly producing electric thermo-currents in dependence on the temperature to which the turbine blades are subjected, and second means including amplifier means controlled by said electric thermocurrents to vary the amount of fuel supplied by said first means to said turbine and limit the maximum temperature to which the turbine blades are subjected to a predetermined value, said second means including additional control means for varying the control effect produced by said second means on said first means, said amplifier means including a hydraulic amplifier and said first means including a servo motor regulating the fuel supply, and feedback means for stabilizing the fuel control including a piston, spring means for maintaining said piston in a central position, the two sides of said piston being connected with each other by a conduit containing an adjustable throttle and connected to respond to varying pressure in said hydraulic amplifier, and means operated by said piston and connected to impose a control function on said amplifier means ahead of said hydraulic amplifier to oppose the adjusting action of said amplifier means, said feedback means including a Wheatstone bridge having a resistor with a slide contact, said piston being connected for actuating said slide contact, said hydraulic amplifier including electrically responsive input means, said amplifier means including a magnetic amplifier with the input thereof connected to said temperature responsive means and with the output thereof connected to the input means of said hydraulic amplifier, and means, including a coil connected diagonally across said bridge and a variable resistance means including said resistor operatively connected therewith, for applying the output from said bridge to said magnetic amplifier.

11. A control apparatus for combustion turbines, comprising first means for regulating the supply of fuel to the combustion turbine, temperature responsive means for sensing a temperature within the turbine and directly producing electric thermo-currents in dependence on the temperature to which the turbine blades are subjected, and second means including a magnetic amplifier controlled by said thermo-electric currents and a hydraulic amplifier controlled by said magnetic amplifier, said first means being operatively connected to and under control of said hydraulic amplifier to vary the amount of fuel supplied by said first means to said turbine to limit the maximum temperature to which the turbine blades are subjected to a predetermined value, said second means including additional control means for varying the control effect produced by said second means on said first means, and means connected to the input circuit of said magnetic amplifier for providing a delaying time constant for the control by said amplifier means to become effective to protect the turbine against pumping.

12. A control apparatus for combustion turbines comprising first means for regulating the supply of fuel to the combustion turbine, temperature responsive means for sensing a temperature within the turbine and directly producing electric thermo-currents in dependence on the temperature to which the turbine blades are subjected, and second means including a magnetic amplifier controlled by said thermo-electric currents and a hydraulic amplifier controlled by said magnetic amplifier, said first means being operatively connected to and under control of said hydraulic amplifier to vary the amount of fuel supplied by said first means to said turbine to limit the maximum temperature to which the turbine blades are subjected to a predetermined value, said second means including additional control means for varying the control effect produced by said second means on said first means, said additional control means including speed responsive means, means responsive to rotational speed of the turbine for providing a voltage dependent on turbine speed, and means for connecting said speed responsive means in series with said temperature responsive means in an input circuit of said magnetic amplifier to provide a signal thereat which is a function of both the temperature sensed and the speed of the turbine, said speed responsive means providing a voltage changing with the square of the turbine speed and connected to be subtracted from the output of said temperature responsive means.

References Cited in the file of this patent

UNITED STATES PATENTS

| | | |
|---|---|---|
| 2,623,354 | Best | Dec. 30, 1952 |
| 2,634,579 | Reynolds et al. | Apr. 14, 1953 |
| 2,687,611 | Larsen | Aug. 31, 1954 |
| 2,690,647 | Woodward | Oct. 5, 1954 |
| 2,706,383 | Jacobson | Apr. 19, 1955 |
| 2,718,114 | Haworth et al. | Sept. 20, 1955 |
| 2,734,340 | Wood | Feb. 14, 1956 |
| 2,740,255 | Machlanski | Apr. 3, 1956 |
| 2,764,023 | Vonnegut | Sept. 25, 1956 |
| 2,764,867 | Farkas | Oct. 2, 1956 |
| 2,766,584 | Stockinger | Oct. 16, 1956 |
| 2,786,330 | Brandau | Mar. 26, 1957 |
| 2,790,303 | Kutzler | Apr. 30, 1957 |

FOREIGN PATENTS

| | | |
|---|---|---|
| 692,666 | Great Britain | June 10, 1953 |
| 714,053 | Great Britain | Aug. 25, 1954 |